US007535903B1

(12) United States Patent
Patel

(10) Patent No.: US 7,535,903 B1
(45) Date of Patent: *May 19, 2009

(54) SYSTEM AND METHOD FOR SEAMLESSLY JOINING MULTICAST SESSION

(75) Inventor: Sujal M. Patel, Seattle, WA (US)

(73) Assignee: Realnetworks, Inc., Seattle, WA (US)

( * ) Notice: Subject to any disclaimer, the term of this patent is extended or adjusted under 35 U.S.C. 154(b) by 590 days.

This patent is subject to a terminal disclaimer.

(21) Appl. No.: 11/219,531

(22) Filed: Sep. 2, 2005

Related U.S. Application Data

(63) Continuation of application No. 09/689,428, filed on Oct. 12, 2000, now Pat. No. 6,973,081.

(51) Int. Cl.
*H04L 12/28* (2006.01)

(52) U.S. Cl. .................................................... 370/390

(58) Field of Classification Search ......... 370/227–232, 370/464–466, 471, 394–395; 709/227, 231, 709/232, 238, 248
See application file for complete search history.

(56) References Cited

U.S. PATENT DOCUMENTS

| | | | |
|---|---|---|---|
| 5,519,704 A | 5/1996 | Farinacci et al. | |
| 5,761,439 A | 6/1998 | Kar et al. | |
| 6,034,966 A * | 3/2000 | Ota | 370/443 |
| 6,181,697 B1 | 1/2001 | Nurenberg et al. | |
| 6,259,701 B1 | 7/2001 | Shur et al. | |
| 6,269,085 B1 | 7/2001 | Provino et al. | |
| 6,370,688 B1 * | 4/2002 | Hejna, Jr. | 725/101 |
| 6,418,473 B1 | 7/2002 | St. Maurice et al. | |
| 6,502,139 B1 * | 12/2002 | Birk et al. | 709/233 |
| 6,515,991 B1 | 2/2003 | McKeown | |
| 6,567,929 B1 | 5/2003 | Bhagavath et al. | |
| 6,965,580 B1 * | 11/2005 | Takagi et al. | 370/312 |
| 7,006,497 B2 * | 2/2006 | Dove et al. | 370/390 |

* cited by examiner

*Primary Examiner*—Dmitry Levitan
(74) *Attorney, Agent, or Firm*—Graybeal Jackson LLP

(57) ABSTRACT

A communications system and method provide a seamless switch from a first session to a plurality of multicast sessions. A server transmits data over both a first session and alternatingly between a plurality of synchronized multicast sessions. At predetermined time intervals, the server stops transmitting data over the currently active multicast session and starts transmitting over an idle multicast session. The server is further responsive to a request to stop transmitting the data over the first session at a time when the server alternates transmission between the multicast sessions. The time intervals are advantageously sufficient to allow a receiver to join an idle multicast channel and to send a request to stop the data transmission over the first session.

28 Claims, 10 Drawing Sheets

SYSTEM AND METHOD FOR SEAMLESSLY JOINING MULTICAST SESSION

CROSS-REFERENCE TO RELATED APPLICATIONS

This application is a continuation of and claims priority to U.S. application Ser. No. 09/689,428 filed Oct. 12, 2000 now U.S. Pat. No. 6,973,081 and entitled "System and Method for Seamlessly Joining Multicast Session" the contents of which are incorporated herein by reference.

BACKGROUND

1. Field

The present invention is related to systems and methods for communicating information over a computer network. More specifically, the present invention relates to systems and methods for switching between communication sessions.

2. Description of the Related Art

The number of people using computers to engage in data communication over public and private networks continues to increase dramatically. This increase in network usage is being fueled at least in part by the growing availability of content-rich multimedia data on the Internet and the World Wide Web. Such data is now accessible over the Internet on many types of channels, each having particular advantages. While switching from one channel type to another may result in greater efficiency, existing techniques for such switching cause intolerable disturbances and interruptions in the user's experience as the data are rendered.

The most common type of data channel is a unicast channel. Over a unicast channel, data packets are sent from one computer on the network to another computer on the network. The sending computer includes in each data packet addressing information which identifies the receiving computer. Unicast communication works adequately in many cases, but is not well suited to support current and emerging multimedia applications in which the same large body of data must be transmitted to large numbers of computers.

Another type of channel is a multicast channel. Using a multicast channel, a single data packet can be sent to a group of computers, known as a multicast group, connected to the network. A networked computer can become a member of a multicast group by joining the multicast group, and can relinquish membership by leaving the multicast group. Only computers which are members of the multicast group receive the data transmitted over the multicast channel.

Multicast's efficient use of network resources is particularly advantageous in wide-area multimedia broadcast applications which may involve thousands or even millions of receiving computers. Much efficiency can be gained when a computer receiving a unicast transmission switches to a multicast transmission of the same data.

For various reasons, it is advantageous to begin sending multimedia data via unicast and then switching to multicast. However, with existing techniques, switching from a unicast session to a multicast session is anything but smooth and certainly not transparent to the computer user. This problem results from the loss of data associated with the switch. In most cases, the unicast session utilizes most of the available bandwidth to transmit the unicast data, thus, the bandwidth will be insufficient to handle the additional multicast data (the bandwidth requirement will be roughly twice as high). Therefore, the existing technique of transmitting simultaneous, overlapping unicast and multicast data often results in lost data.

Another existing technique is to stop receiving unicast data and to request and begin receiving multicast data. However, if the unicast session shuts down prior to receiving the multicast data, the time difference between these two operations again results in lost data.

When data are lost in switching from a unicast session to a multicast session, users will experience an unpleasant interruption in the rendering of any media data because of the loss of data associated with the switch. What is needed is a system and method that can provide the computer user with a transparent, seamless, smooth switch from receiving data over a unicast channel to receiving data over a multicast channel.

SUMMARY

In one embodiment of the invention, a communications system provides a seamless switch from initially receiving data over a unicast session to receiving the data over a plurality of multicast sessions. The communication system comprises: (1) a server transmitting the data over the unicast session, where the unicast session transmits a multicast sequencing data, the server responsive to a request to stop transmitting the data over the unicast session at a next multicast synchronize point; and (2) the server transmitting the data over a plurality of synchronized multicast sessions, the server sequencing the transmission of the data in accordance with the multicast sequencing data between the plurality of multicast sessions wherein the server uses one of the plurality of multicast sessions to transmit the data for a predetermined period of time at any point in time. In one aspect of the embodiment, the plurality of multicast sessions includes a first multicast session and a second multicast session. In another aspect of the embodiment, the data comprises a multimedia stream. In yet another aspect of the embodiment, the multicast sequencing data is transmitted before the data. In yet a further aspect of the embodiment, the multicast sequencing data is transmitted over a unicast control channel. In still a further aspect of the embodiment, the multicast sequencing data is transmitted at periodic intervals. In one aspect of the embodiment, the predetermined period of time is substantially the same for the plurality of multicast sessions. In another aspect of the embodiment, the predetermined period of time is different for the plurality of multicast sessions. In yet another aspect of the embodiment, the predetermined period of time corresponds to the transmission of a number of packets. In a further aspect of the embodiment, the predetermined period of time is based on time units. In yet a further aspect of the embodiment, at any point in time prior to the request to stop, the unicast session and the one multicast session transmitting are transmitting substantially the same data. In still a further aspect of the embodiment, the predetermined period of time is longer than the sum of the time required for a client to join one of the plurality of multicast sessions and the time required for the client to request the termination of the data transmission over the unicast session at the next multicast synchronize point. In one aspect of the embodiment, the multicast synchronize point is substantially at the end of the predetermined period of time. In another aspect of the embodiment, the request to stop transmitting the data over the unicast session is received over a unicast control channel. In yet another aspect of the embodiment, the request to stop transmitting the data over the unicast session is received over the unicast session. In a further aspect of the embodiment, the multicast sequencing data includes an ordering of the multicast sessions and the predetermined period of time. Still another aspect of the communication system further comprises a client configured to receive the data over the unicast session, the client responsive to a signal to: (1) join the plurality of multicast sessions, the client identifying as a joinable multicast session one of the plurality of multicast sessions which is not currently transmitting the data and which will not be transmitting for at least a sufficiently long time, the client joining the joinable multicast session, the client joining the remaining multicast sessions when the client starts receiving the data over the joinable multicast session; and (2) transmit to the server the request to stop transmitting the data over the unicast session at the next multicast synchronize point. In one aspect of the embodiment, the predetermined period of time is longer than the sufficiently long time. In another aspect of the embodiment, the sufficiently long time is longer than the sum of the time required for the client to join one of the plurality of multicast sessions and the time required for the client to request the termination of the data transmission over the unicast session at the next multicast synchronize point. In still another aspect of the embodiment, the signal to join the multicast session is a user request. In yet another aspect of the embodiment, the signal to join the multicast session is automatically issued by the client. In a further aspect of the embodiment, the client is further responsive to a signal to unsubscribe from the unicast session once the client starts receiving the data over the joinable multicast session.

In another embodiment, a communications system providing a seamless switch from initially receiving data over a unicast session to receiving the data over a plurality of synchronized multicast sessions comprises a client configured to receive the data over the unicast session, the client responsive to a signal to: (1) join the plurality of multicast sessions, the client identifying as a joinable multicast session one of the plurality of multicast sessions which is not currently transmitting the data and which will not be transmitting for at least a sufficiently long time, the client joining the joinable multicast session, the client joining the remaining multicast sessions when the client starts receiving the data over the joinable multicast session; and (2) transmit to the server the request to stop transmitting the data over the unicast session at the next multicast synchronize point. In one aspect of the embodiment, the sufficiently long time is longer than the sum of the time required for the client to join one of the plurality of multicast sessions and the time required for the client to request the termination of the data transmission over the unicast session at the next multicast synchronize point. In another aspect of the embodiment, the signal to join the multicast session is a user request. In still another aspect of the embodiment, the signal to join the multicast session is automatically issued by the client. In a further aspect of the embodiment, the client is further responsive to a signal to unsubscribe from the unicast session once the client starts receiving the data over the joinable multicast session.

In still another embodiment, a method of permitting a seamless switch from a unicast session to a plurality of synchronized multicast sessions comprises the acts of: (1) transmitting first data over the unicast session; (2) transmitting second data over the plurality of synchronized multicast sessions, the plurality of synchronized multicast sessions are further sequenced such that one of the plurality of multicast sessions transmits a portion of the second data for a predetermined period of time at any point in time; (3) transmitting multicast sequencing data; and (4) terminating the transmitting of the first data over the unicast session. Another aspect of the method further comprises the act of synchronizing the unicast session and the multicast sessions. In one aspect of the embodiment, the plurality of multicast sessions includes a first multicast session and a second multicast session. In another aspect of the embodiment, the first and second data comprise multimedia streams. In a further aspect of the embodiment, the multicast sequencing data is transmitted before the second data. In yet a further aspect of the embodiment, the multicast sequencing data is transmitted over a unicast control channel. In still a further aspect of the embodiment, the multicast sequencing data is transmitted at periodic intervals. In one aspect of the embodiment, the predetermined period of time is substantially the same for each of the plurality of multicast sessions. In another aspect of the embodiment, the predetermined period of time is different for each of the plurality of multicast sessions. In yet another aspect of the embodiment, the predetermined period of time corresponds to the transmission of a number of packets. In a further aspect of the embodiment, the predetermined period of time is based on time units. In yet a further aspect of the embodiment, at any point in time prior to the terminating, the unicast session and one of the plurality of multicast sessions transmits substantially the same data. In still a further aspect of the embodiment, the predetermined period of time is longer than the sum of the time required for the client to join one of the plurality of multicast sessions and the time required for the client to request the termination of the data transmission over the unicast session at the next multicast synchronize point. In one aspect of the embodiment, the multicast synchronize point is substantially at the end of the predetermined period of time. In another aspect of the embodiment, the terminating is in response to a request to stop transmitting the data over the unicast session, the request transmitted over a unicast control channel. In yet another aspect of the embodiment, the request to stop transmitting the data over the unicast session is received over the unicast session.

In yet another embodiment, a method of seamlessly switching from a unicast session to a plurality of synchronized multicast sessions comprises the acts of: (1) receiving data over the unicast session; (2) detecting multicast support by an underlying network; (3) determining a joinable multicast session from the plurality of multicast sessions; (4) joining the joinable multicast session; (5) requesting the unicast session to stop transmitting the data at a next synchronize point; and (6) joining the remainder of the plurality of multicast sessions once the data starts to be received over the joinable multicast session. Another aspect of the method further comprises the act of unsubscribing from the unicast session.

In a further embodiment, an apparatus providing a seamless switch from a unicast session to a plurality of multicast sessions comprises: (1) a transmitting means for transmitting data over the unicast session; (2) a transmitting means for transmitting the data over a plurality of synchronized multicast sessions; (3) a sequencing means for sequencing the plurality of multicast sessions wherein one of the plurality of multicast sessions transmits the data for a predetermined period of time at any point in time; and (4) a receiving means for receiving a request to stop transmitting the data over the unicast session at a next multicast synchronize point.

In yet a further embodiment, a system for switching from receiving data over a first session to receiving data over first and second multicast sessions, comprises: (a) a data transmitter transmitting first data over the first session, the data transmitter responsive to a stop request to stop transmitting the first data over the first session at a multicast synchronize point; and (b) the data transmitter alternatingly transmitting second data over the first and second multicast sessions, the second multicast session idle when the data transmitter transmits a portion of the second data over the first multicast session, the first multicast session idle when the data transmitter transmits a different portion of the second data over the second multicast session, the data transmitter alternating the transmission of the second data from one of the first and second multicast sessions to the other of the first and second multicast sessions at the multicast synchronize point. One advantageous aspect of the system is one wherein the data transmitter transmits multicast sequencing data representing the multicast synchronize point. A further aspect of the system is one wherein the data transmitter transmits the multicast sequencing data over the first session. An alternative aspect of the system is one wherein the data transmitter transmits the multicast sequencing data over at least one of the first and second multicast sessions. Still a further alternative aspect of the system is one wherein the data transmitter transmits the multicast sequencing data over a fourth session. Another advantageous aspect of the system is one wherein the data transmitter transmits multicast sequencing data representing a duration between at least two multicast synchronize points, the duration sufficient for a receiver to join one of the first and second multicast sessions and sufficient for the data transmitter to respond to a stop request sent by the receiver to stop transmitting the first data over the first session at a multicast synchronize point. Yet another advantageous aspect of the system is one wherein the first data and the second data represent substantially the same information. A still further advantageous aspect of the system is one wherein the first data and the second data represent substantially the same information transmitted at substantially the same time.

In a still further embodiment, an apparatus providing a seamless switch from a first session to first and second multicast sessions, comprises: (a) means for transmitting first data over the first session; (b) means for transmitting second data over first and second multicast sessions; (c) means for sequencing the second data over the first and second multicast sessions so that the first multicast session transmits first portions of the second data while the second multicast session is idle and so that the second multicast session transmits second portions of the second data while the first multicast session is idle, wherein the first and second multicast sessions transition from a transmitting state to an idle state or from an idle state to a transmitting state at a multicast synchronize point; and (d) means responsive to a stop request to stop transmitting the data over the first session at a multicast synchronize point. One advantageous aspect of the apparatus is one wherein the first multicast session transmits the first portions of the second data for a duration sufficient to allow a receiver to join the second multicast session and sufficient for the receiver to send the stop request to cause the first session to stop transmitting data at the next multicast synchronize point.

In another embodiment a multi-session data stream transmitted from a data source to a data receiver comprises: (a) a first session including first data; (b) a first multicast session including second data substantially representing first portions of the first data, the first multicast session transitioning to transmit no data at odd multicast synchronize points and transitioning to transmit the second data at even multicast synchronize points; (c) a second multicast session including third data substantially representing portions of the first data not represented by the second data, the second multicast session transitioning to transmit the third data at odd multicast synchronize points and transitioning to transmit no data at even multicast synchronize points; and (d) multicast sequencing data representing durations between multicast synchronize points, at least half of the durations sufficient for the receiver to join the first multicast session or the second multicast session and also sufficient for the receiver to send a stop request causing the first session to stop transmitting the first data.

These and other embodiments are described in more detail below.

BRIEF DESCRIPTION OF THE DRAWINGS

These and other aspects, advantages, and novel features of the invention will become apparent upon reading the following detailed description and upon reference to accompanying drawings in which.

DETAILED DESCRIPTION

Prior Art

Figure 1:
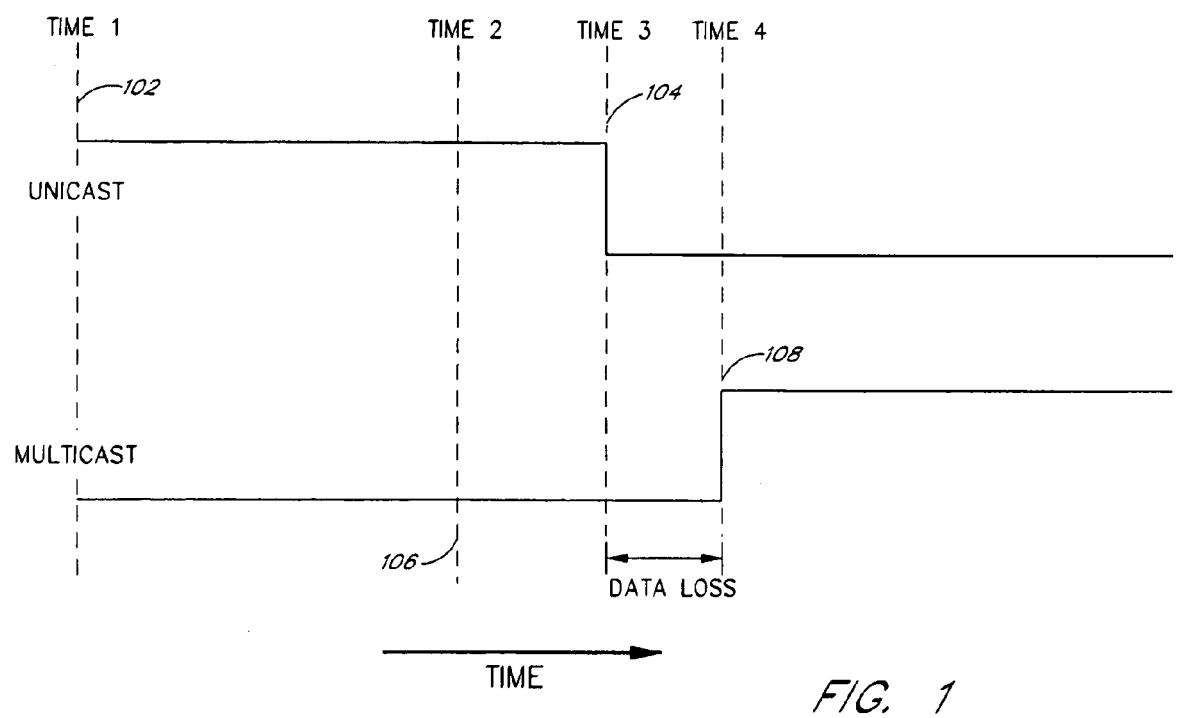
FIG. 1 is an illustration depicting a prior art communication between a source node and a destination node across time in a conventional network connection.

FIG. 1 is an illustration depicting prior art communication sessions between a source node and a destination node across time in a conventional network connection. More particularly, FIG. 1 illustrates an existing technique for switching from receiving data over a unicast channel to receiving data over a multicast channel at the destination node. At a time 1 102 until a time 3 104, the destination node receives data over a unicast session. As used herein, a session refers to a time wherein two computers maintain a connection through which data communication may occur. During the unicast session, for example, at a time 2 106, the destination node detects the capability to receive a multicast transmission of the data. The destination node transmits to the source node a request to terminate the unicast session at a time after detecting the capability to receive the multicast session. The source node receives the terminate unicast session request and subsequently terminates the unicast session. At the time 3 104, the unicast session is terminated, and the destination node no longer receives data over the unicast session.

Upon termination of the unicast session, the destination node transmits a request to join the multicast session. At a time 4 108, the destination node starts receiving data over the multicast session. Between the time 3 104 when the unicast session was terminated and the time 4 108 when data was first received over the multicast session, there is data loss. This data loss results from the inherent latency involved in terminating one session and joining another session.

Figure 2:
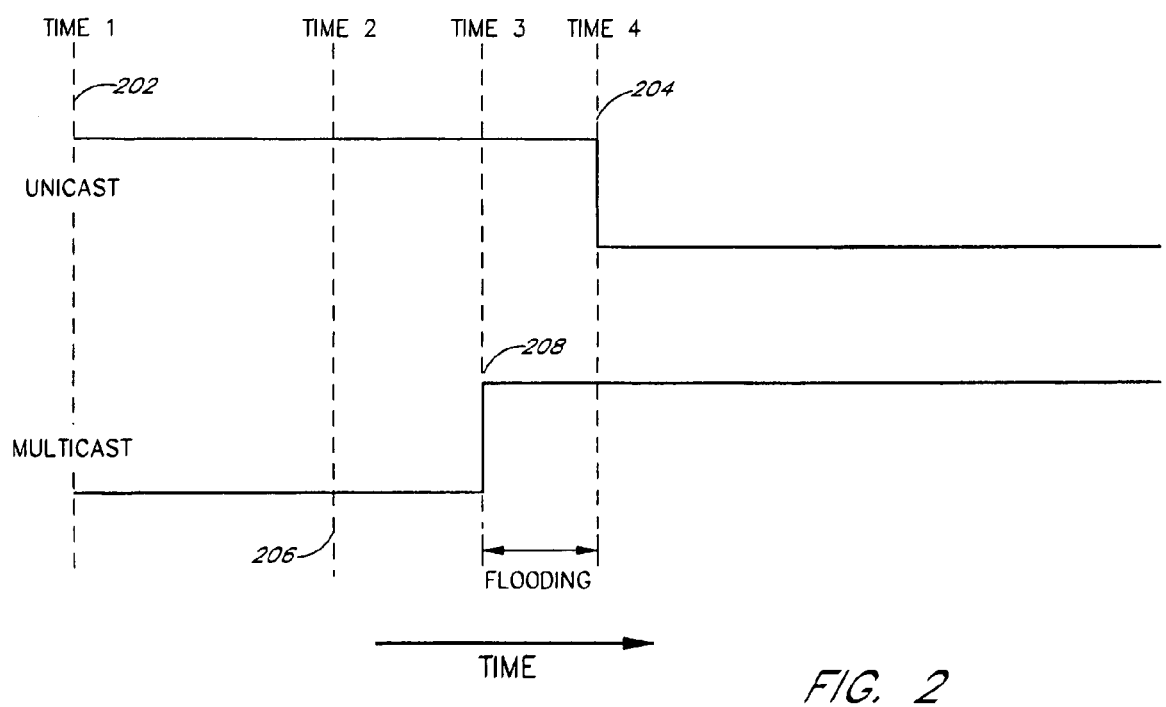
FIG. 2 is an illustration depicting another prior art communication between a source node and a destination node across time in a conventional network connection.

FIG. 2 is an illustration depicting a prior art method of preventing data loss while switching between a unicast session and a multicast session in the conventional network connection. At a time 1 202 until a time 4 204, the destination node is receiving data over a unicast session. During that time, for example, at a time 2 206, the destination node detects the capability to receive a multicast transmission of the data. The destination node transmits a request to join the multicast session at a time shortly after detecting the capability to receive the multicast session. At a time 3 208, the destination node starts to receive data over the multicast session.

Having started receiving data over the multicast session, the destination node transmits to the source node a request to terminate the unicast session. The source node receives the terminate unicast session request and subsequently terminates the unicast session. At the time 4 204, the unicast session is terminated, and the destination node no longer receives data over the unicast session. Between the time 3 208 and the time 4 204, the destination node receives data over both the unicast session and the multicast session. If the transmission of the unicast session data consumes a substantial portion of the available bandwidth, then any attempt to receive data simultaneously over both the unicast session and the multicast session results in flooding of the network. The flooding occurs because the communication link will be unable to accommodate the increased bandwidth requirement. This flooding also results in data loss because the destination node cannot receive and process all of the data causing the flooding.

Prior art systems and methods provide no ability for a destination node to stop receiving data over a unicast session and to smoothly and seamlessly begin receiving data over the multicast session.

Present Invention

In one embodiment of the invention, a client node is connected to a network such as, for example, the Internet. The client node initially starts receiving data from a server over a unicast session. A server simultaneously transmits the data over a plurality of synchronized multicast sessions. The multicast sessions are synchronized such that a transmitting multicast session starts transmitting the data from a point at which a previously transmitting multicast session stopped transmitting. Thus, there is no overlap in the transmission of the data over the plurality of multicast sessions. Moreover, the plurality of multicast sessions are sequenced such that the multicast sessions transmit in a certain order, and, at any point in time, at most one of the plurality of multicast sessions is transmitting the data for a predetermined period of time. Moreover, the server transmits information related to the sequencing of the data transmission over the plurality of multicast sessions or via another mechanism. In one embodiment, this multicast sequencing data is transmitted before the start of the data transmission over the unicast session. The sequencing data may advantageously be used by the client node in determining which multicast session to join.

The client node may advantageously detect the support of multicast sessions over the network. That detection may be in the form of joining a multicast beacon channel and receiving a beacon packet transmitted by a server or router connected to the network. Having detected multicast support, the client node can request that the data be received over the multicast session instead of the unicast session.

The client node can determine which of the sequenced multicast sessions to join from the sequencing data received from the server over the unicast session. The client node may advantageously select a multicast session which is currently not transmitting data and which will not be transmitting any data for a sufficiently long period of time. The sufficiently long period of time is long enough to enable the client node to successfully join a multicast session and request the server to stop transmitting over a unicast session at substantially the same time the server starts transmitting over a multicast session currently not transmitting. The client can request to join one of potentially many multicast sessions currently not transmitting.

Having started to receive data over the recently joined multicast session, the client can request to join the other multicast sessions which are participating in the transmission of the data from the server. Thus, the client is able to seamlessly switch from initially receiving data over a unicast session to receiving the data over a plurality of synchronized multicast sessions without experiencing any data loss or replication.

The present invention is suitable for switching from receiving any broadcast data transmitted over a first session to receiving any broadcast data transmitted over a plurality of multicast sessions in any network with multicast support. As used herein, broadcast data refers to any data transmitted from a data source, such as a server computer, for receipt by a consumer, such as a client computer. Though the broadcast data may be any data, and the data source and consumer may be embodied by a variety of systems, the invention will be further disclosed in the context of a server computer transmitting a multimedia stream (e.g., a video, audio, image or slideshow presentation) to a client computer over the Internet. Throughout the drawings, components which correspond to components shown in previous figures are indicated using the same reference numbers.

Computer networks suitable for use with the present invention include local area networks (LAN), wide area networks (WAN), Internet, or other connection services and network variations such as the World Wide Web, the public internet, a private internet, a private computer network, a secure internet, a private network, a public network, a value-added network, and the like. The computer network may include one or more LANs, WANs, Internets, and computers. The computers connected to the network may be any microprocessor controlled device that permits access to the network, including terminal devices, such as personal computers, workstations, servers, mini computers, main-frame computers, laptop computers, mobile computers, palm top computers, hand held computers, set top box for a TV, or a combination thereof. The computers may further possess input devices such as a keyboard or a mouse, and output devices such as a computer screen or a speaker. The computers may serve as servers, clients, or a combination thereof.

Figure 3:
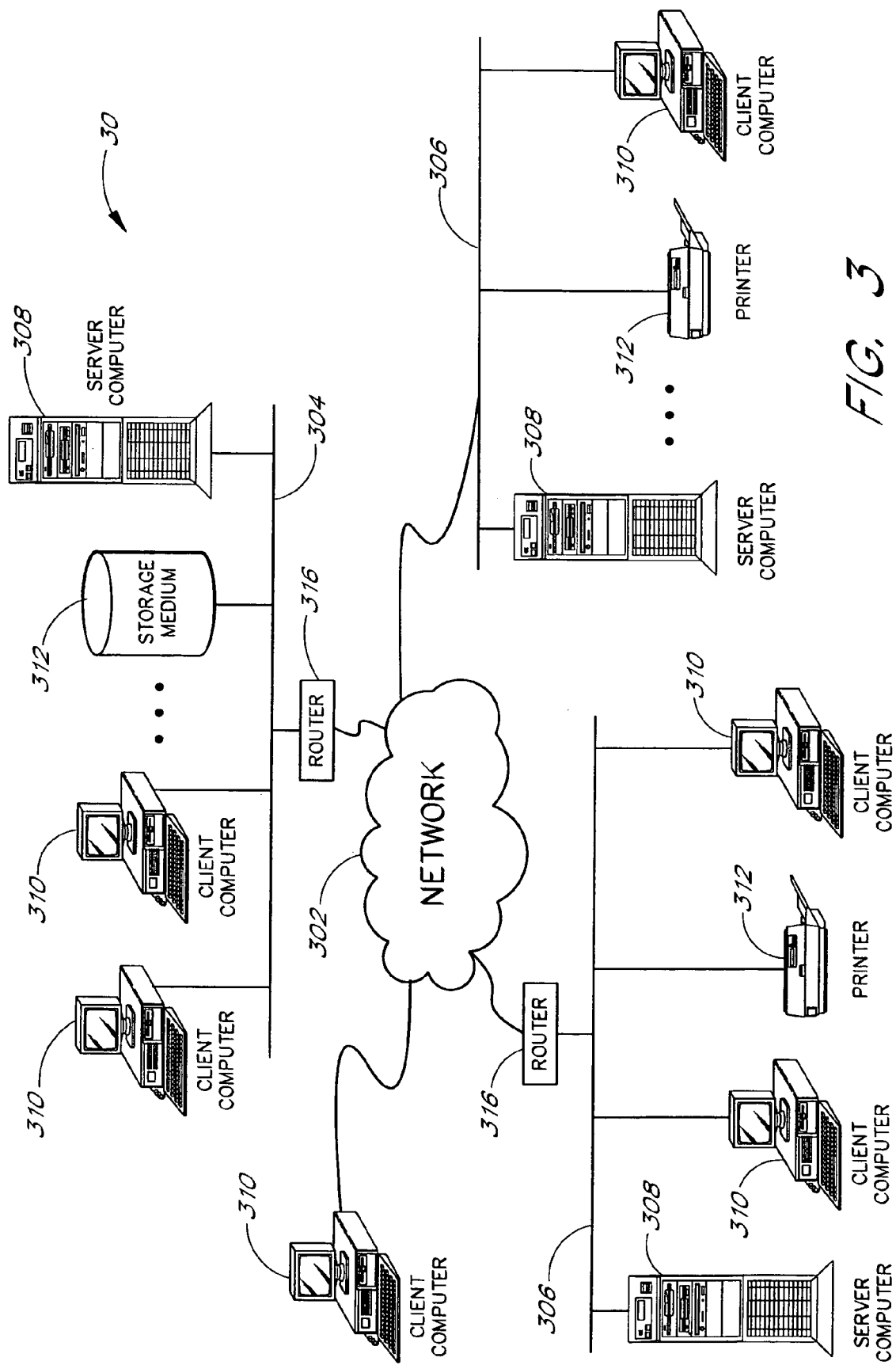
FIG. 3 is a system block diagram illustrating an embodiment of the overall network architecture of the invention.

One network architecture suitable for use with one preferred embodiment of the invention is indicated generally by a system 30 in FIG. 3. The system 30 may include a network 302, which represents a computer network as previously described, providing network connection between the attached devices. The system 30 may further include a local area network 304 which is connectable to other networks 306. The local area network 304 and the other networks 306 may be connected to the network 302 directly or through a connection device such as a router 316 or other similar mechanisms.

In one embodiment, the system 30 conforms to the Transmission Control Protocol/Internet Protocol (TCP/IP) industry standard. In other embodiments, the system 30 may conform to other network standards, including, but not limited to, the International Standards Organization's Open Systems Interconnection, IBM's SNA®, Novell's Netware®, and Banyon VINES®, that facilitate communication between the attached devices.

The system 30 further includes one or more servers 308 that are connected by network signal lines to one or more clients 310. The servers 308 and clients 310 may be connected to the local area network 304, the other networks 306, or directly to the network 302 using a device such as a modem. The signal lines may include, by way of example, twisted pair cables, coaxial cables, fiber optic cables, telephone lines, satellites and ground stations, and microwave relays. The server 308 and the client 310 may advantageously be a computer as previously described. Also attached to the system 30 are a storage medium 314 and printers 312 which are respectively connected by network signal lines to the local area network 304 and other networks 306.

Those of ordinary skill in the art will recognize that a given computer may function both as a client 310 and a server 308. These computers may be uniprocessor or multiprocessor machines. Additionally, these computers may include an addressable storage medium such as, by way of example, random access memory, and may further include a non-volatile storage medium such as, by way of example, a magnetic or optical disk. The addressable storage medium and/or the non-volatile storage medium may advantageously contain a specific physical substrate configuration such as, for example, a computer program, representing data and instructions which cause the computer to operate in a specific and predefined manner as described herein.

In one embodiment, the server 308 may advantageously execute a web server such as, by way of example, Apache Web Server software. The server 308 may execute media serving software such as, for example, RealNetworks' RealServer software. The client 310 may advantageously execute a web browser such as, by way of example, Netscape Communicator software or may execute media playing software such as, for example, RealNetworks' RealPlayer software, or both.

Figure 4:
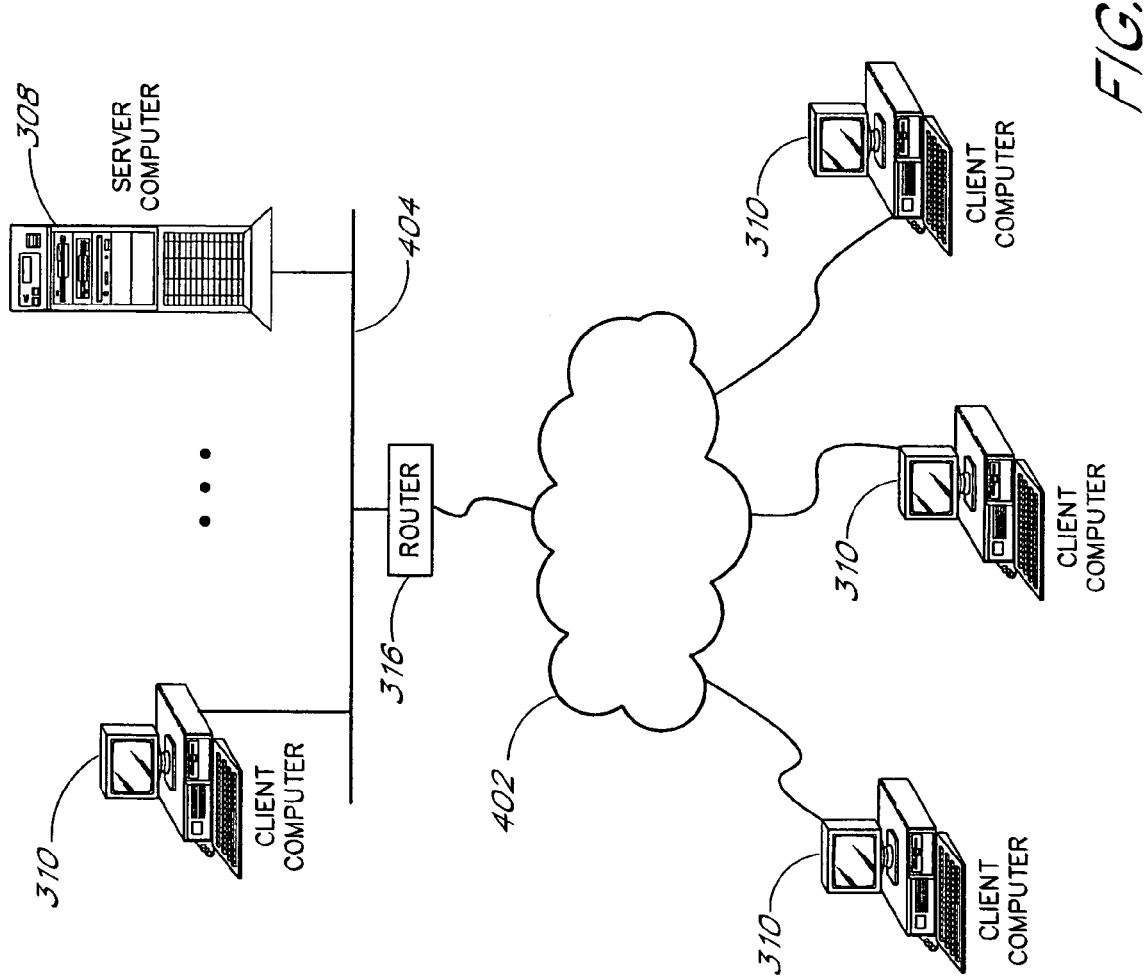
FIG. 4 is a system block diagram illustrating an embodiment of a communication between a server and clients.

FIG. 4 is an illustration of one embodiment of a communication between a server 308 and one or more clients 310. The server 308 is connected to a local area network 404. Devices connected to the Internet 402 or to the local area network 404 may establish a communication link to the server 308. The local area network 404 is connected to the Internet 402 through a router 116. One or more clients 310 may advantageously be connected to the local area network 404. One or more clients 310 may also be connected to the Internet 402 through a connection device such as, for example, a modem.

In one example, the server 308 runs web server software to operate as a web server connected to the Internet 402 through the local area network 404 and the router 316. A user on a client 310 can run web browser software to connect to and communicate with the server 308. The server 308 can then respond to any request received from the web browser executing on the client 310.

The server 308 may be scheduled to transmit a multimedia stream of a video presentation over the Internet 402 at a specific time. In one embodiment, the multimedia stream is a streaming media presentation compatible with RealNetworks' RealServer and RealPlayer software components.

In one embodiment, the user can establish a unicast session between the client 310 and the server 308. The server 308 can transmit the multimedia stream over the unicast session established by the client 310. The server 308 simultaneously transmits the multimedia stream over a plurality of sequenced multicast sessions. The server 308 sequences the multicast sessions by ordering the plurality of multicast sessions and by transmitting the multimedia stream data over one multicast session at a time. The plurality of multicast sessions are synchronized such that no part of the multimedia stream is transmitted more than once over the plurality of multicast sessions.

In one embodiment, the server 308 can transmit the multimedia stream over a first multicast session A for a predetermined period of time and then transmit over a second multicast session B for a predetermined period of time before again transmitting the multimedia stream over the first multicast session A. The server 308 thus alternates the transmission of the multimedia stream between sessions A and B until the transmission of the multimedia stream completes or is otherwise terminated. The predetermined period of time advantageously is longer than the sum of the time required for the client 310 to join a multicast session and the time required for the client 310 to request the server 308 to stop transmitting over the unicast session at a next multicast synchronize point. Thus, switching from receiving the multimedia stream over the unicast session to receiving the multimedia stream over the plurality of multicast sessions is seamless to the client 310.

The point at which the server 308 alternates transmitting over the multicast sessions A and B can be referred to as the multicast synchronize point. Those of ordinary skill in the art will realize that the predetermined period of time may be a period of time such as, by way of example, a physical length of time or the time required to transmit a number of packets. For example, the first ten (10) seconds of the multimedia stream can be transmitted over multicast session A and the next ten (10) seconds of the multimedia stream can be transmitted over multicast session B. Multicast sessions A and B can then alternate transmitting subsequent ten (10) second portions of the multimedia stream until the entire multimedia stream has been transmitted. It will be readily appreciated that, in another embodiment, the multimedia stream may be transmitted over three or more multicast sessions.

In one embodiment, the transmission of the multimedia stream over the unicast session and over a first of the multicast sessions A or B may advantageously be synchronized by being started at substantially the same time. At a given point in time, the unicast session and the multicast session (either A or B) may advantageously be transmitting substantially the same portion of the multimedia stream. Additionally, the multicast sequencing data may advantageously be transmitted to a client 310 substantially at the beginning of the multimedia stream transmission over the unicast session. In another embodiment, the multicast sequencing data may be transmitted before the start of the transmission of the multimedia stream. In yet another embodiment, the multicast sequencing data may be sent to the client 310 over a unicast control channel. In yet a further embodiment, the multicast sequencing data may be sent at periodic intervals during the transmission of the multimedia stream.

The unicast session may advantageously be established by the client 310 before or at substantially the same time as the start of the multimedia stream transmission. This allows the client 310 to receive the multicast sequencing data transmitted by the server 308 at the start of the transmission over the unicast session.

In one embodiment, the user can use the client 310 connected to the local area network 404 to receive the multimedia stream. In another embodiment, the client 310 may be connected to the Internet 402. The client 310 would join a multicast beacon to determine if multicast is supported by the underlying network. The multicast beacon may advantageously be a multicast channel transmitting a beacon packet at various intervals. After joining the multicast beacon, the client 310 can determine if it receives the beacon packet or not. It will be appreciated that, generally, if the client 310 receives the beacon packet, then multicast is supported by the underlying network.

If the client 310 is capable of receiving the multicast transmission of the multimedia stream, it is advantageous for the client 310 to switch from receiving the multimedia stream over the unicast session to receiving the multimedia stream over the multicast session. A single multicast transmission of a multimedia stream may be received by a plurality of clients 310 capable of receiving the multicast transmission. Alternatively, if multicast is not supported or available, then each client 310 will need to establish a unicast session with the server 308 to receive the multimedia stream.

In one embodiment, the ability to receive the multimedia stream over the plurality of multicast sessions can be indicated to the user by, for example, a selectable option displayed on the client screen. The selectable option may always appear on the client screen. Alternatively, the selectable option may only be present if multicast is supported. Upon the user selecting the option, the client 310 can switch from receiving the multimedia stream over the unicast session to receiving the multimedia stream over the plurality of multicast sessions. In another embodiment, the client 310 may automatically switch from receiving the multimedia stream over the unicast session to receiving the multimedia stream over the plurality of multicast sessions upon detecting the support of multicast.

The client 310 determines the multicast session to join from the sequencing data received from the server 308. The client 310 determines which of the multicast sessions, either A or B, is not currently transmitting the multimedia stream. For example, if the server 308 alternated transmitting between the multicast sessions A and B every ten (10) seconds, and moreover, initially started transmitting over multicast session A, the client 310 can determine which multicast session, A or B, is currently not transmitting by utilizing a timer to time the length of the multimedia stream transmission received over the unicast session. In another embodiment, the client 310 may reset the timer every ten (10) seconds and utilize a flag to indicate the multicast session, either A or B, that should be transmitting.

The client 310 can determine the length of time before the idle multicast session will start transmitting the multimedia stream (the "time t"). The client 310 advantageously knows an approximate period of time (the "time j") required to join a multicast session. Moreover, the client 310 advantageously knows an approximate period of time (the "time s") required to request the server 308 to stop transmitting over the unicast session at the next multicast synchronize point. If the time t is greater than the sum of the time j and time s, then the client 310 may join the idle multicast session. In one embodiment, a multicast session is joined by the client 310 by transmitting a request to join a specific multicast session to a neighboring multicast-capable router. The client 310 may advantageously join the multicast session by joining a multicast group for that session by, for example, transmitting a group membership protocol message. A group membership protocol message specification suitable for use with one embodiment of the invention may be found in IGMP Version 1 as specified in RFC-1112. Conversely, if the sum of the time j and the time s is greater than the time t, the client 310 can wait a time t until the presently transmitting session stops transmitting and becomes the idle multicast session. The client 310 can then join the multicast session that recently became idle.

Having successfully joined the idle multicast session, the client 310 issues a request to the server 308 to stop transmitting over the unicast session at the next multicast synchronize point. In one embodiment, the client 310 may unsubscribe from the unicast session. The next multicast synchronize point is when the server 308 stops transmitting over the currently transmitting multicast session and begins transmitting over the currently idle multicast session. In one embodiment, the request to stop transmitting over the unicast session at the next multicast synchronize point is sent over a unicast control channel. In another embodiment, the request to stop transmitting over the unicast session at the next multicast synchronize point may be sent over the unicast session as part of, for example, a confirmation packet.

Once the client 310 starts receiving the multimedia stream over the recently joined multicast session, the client 310 can issue a request to join the other multicast session. The other multicast session is not transmitting and there is sufficient time to join the multicast session before the requested session starts transmitting again. Thus, in contrast to conventional network connections, the present invention enables the user to experience a smooth transition, without loss or replication of data, from initially receiving a multimedia stream over a unicast session to receiving the same multimedia stream over a plurality of multicast sessions.

In one embodiment, the server 308 and the client 310 may advantageously be executing instructions contained in one or more modules causing the server 308 and the client 310 to operate in the manner described herein. The module may be any collection of instructions executable by a computer. For example, the server 308 may execute instructions of a channel transition server module allowing it to perform functions such as, by way of example, transmitting the multimedia stream over a unicast session, transmitting the sequencing data, and transmitting the multimedia stream over two or more synchronized multicast sessions. The client 310 may execute instructions of a channel transition client module allowing it to receive the multimedia stream over the unicast session, receive the sequencing data, determine if multicast is supported, and switch to receive the multimedia stream over the two or more multicast sessions. One of ordinary skill in the art will realize that instructions of the channel transition server module or the channel transition client module could be located in whole or in part in other modules either running on or operably connected to either the server 308 or the client 310.

Figure 5:
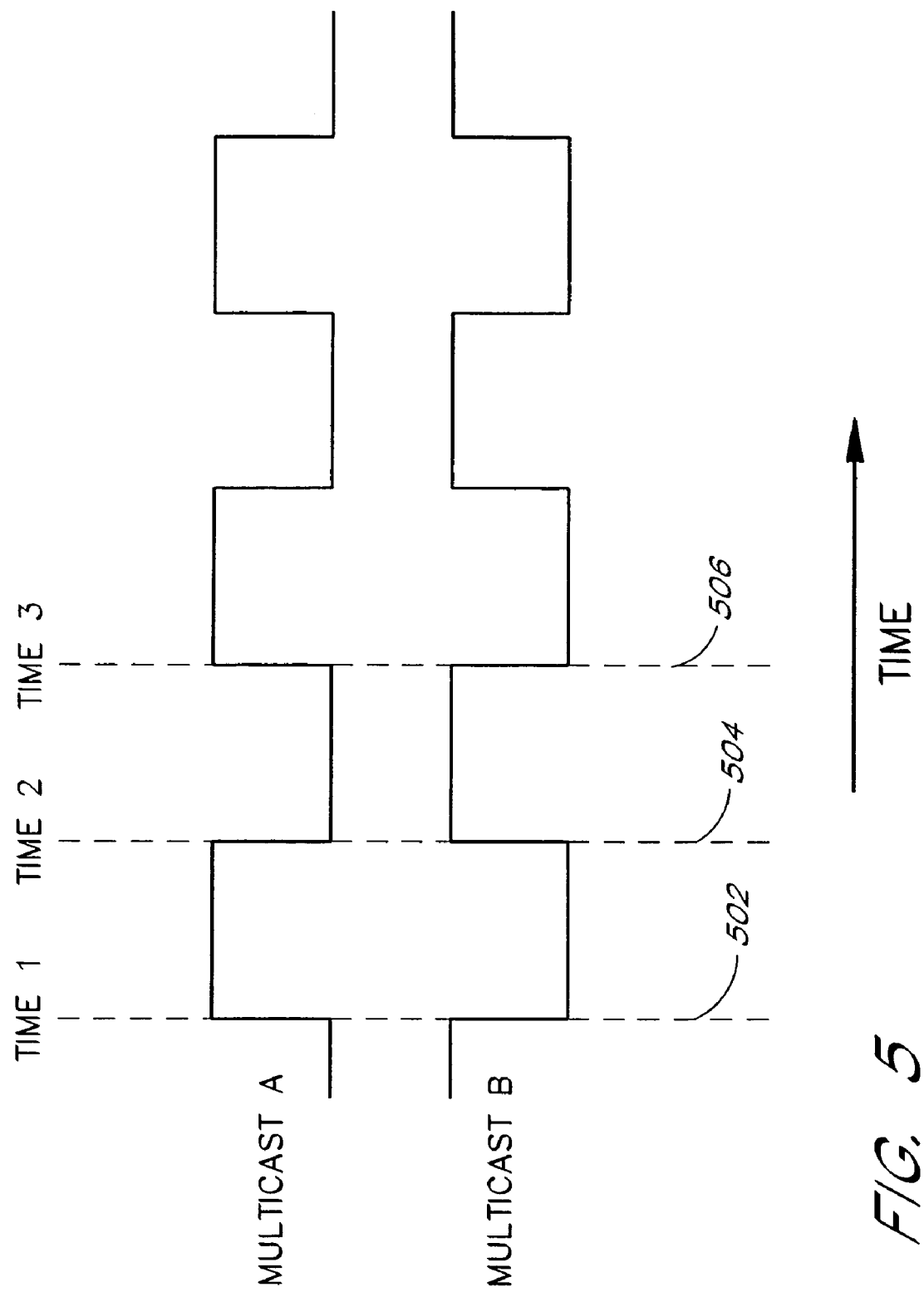
FIG. 5 is a timeline diagram illustrating an embodiment of the sequencing of the multimedia stream transmission over a plurality of multicast sessions.

FIG. 5 is a timeline diagram illustrating one embodiment of the sequencing of the multimedia stream transmission over a multicast session A and a multicast session B. At a time 1 502, the multimedia stream starts transmitting over multicast session A and stops transmitting over multicast session B. Moreover, the time 1 502 is a multicast synchronize point in that the previously idle multicast session begins transmitting and the previously transmitting multicast session becomes idle. From the time 1 502 until a time 2 504, the multimedia stream is transmitted over the multicast session A. The time 2 504 is another multicast synchronize point at which the multimedia stream stops transmitting over the multicast session A and starts transmitting over the multicast session B. The multimedia stream is transmitted over the multicast session B until the next multicast synchronize point at a time 3 506.

The length of time between two successive multicast synchronize points is sufficiently long enough to enable a client 310 receiving the multimedia stream over a unicast session to join the presently idle multicast session and request the transmitting server 308 to stop transmitting over the unicast session at the next multicast synchronize point. In one embodiment, the length of time between each successive multicast synchronize points is substantially the same. In another embodiment, the length of time between each successive multicast synchronize points may be different, thus allowing the multicast session A and multicast session B to transmit for different lengths of time.

Figure 6:
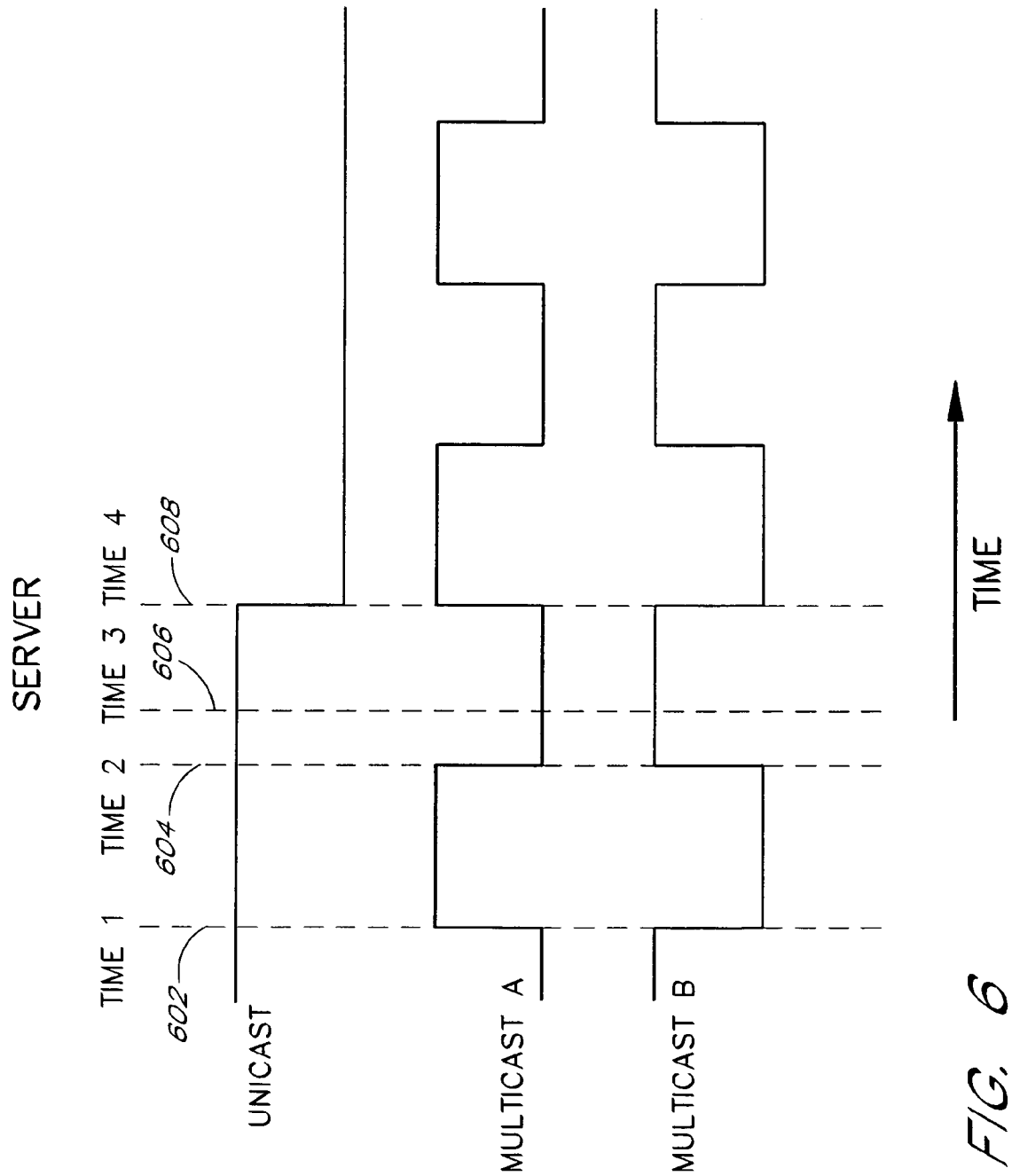
FIG. 6 is a timeline diagram illustrating an embodiment of the multimedia stream transmission at a transmitting server.

FIG. 6 is a timeline diagram illustrating one embodiment of the multimedia stream transmission at a transmitting server 308. The server 308 transmits the multimedia stream over both a unicast session and a pair of synchronized multicast sessions A and B. The multicast session A and multicast session B transmit for equal lengths of time. At a time 1 602, both the unicast session and the multicast session A are transmitting the multimedia stream while the multicast session B is idle. The server 308 stops transmitting the multimedia stream over one multicast session and continues transmitting the multimedia stream over the other multicast session at each multicast synchronize point. A time 2 604 is one such multicast synchronize point. As illustrated, at the time 2 604, the server 308 stops transmitting over the multicast session A and starts transmitting the multimedia stream over the multicast session B. At a time 3 606, the server 308 receives a request to stop transmitting the multimedia stream over the unicast session at the next multicast synchronize point. The time 3 606 occurs at a time after the time 2 604 and at a time substantially before a time 4 608, the next multicast synchronize point, thus, enabling the server 308 to stop transmitting the multimedia stream over the unicast session before the next multicast synchronize point. At the multicast synchronize point time 4 608, the server 308 stops transmitting the multimedia stream over the unicast session. From the time 4 608, the server continues alternating the transmission of the multimedia stream over the pair of synchronized multicast sessions A and B.

Figure 7:
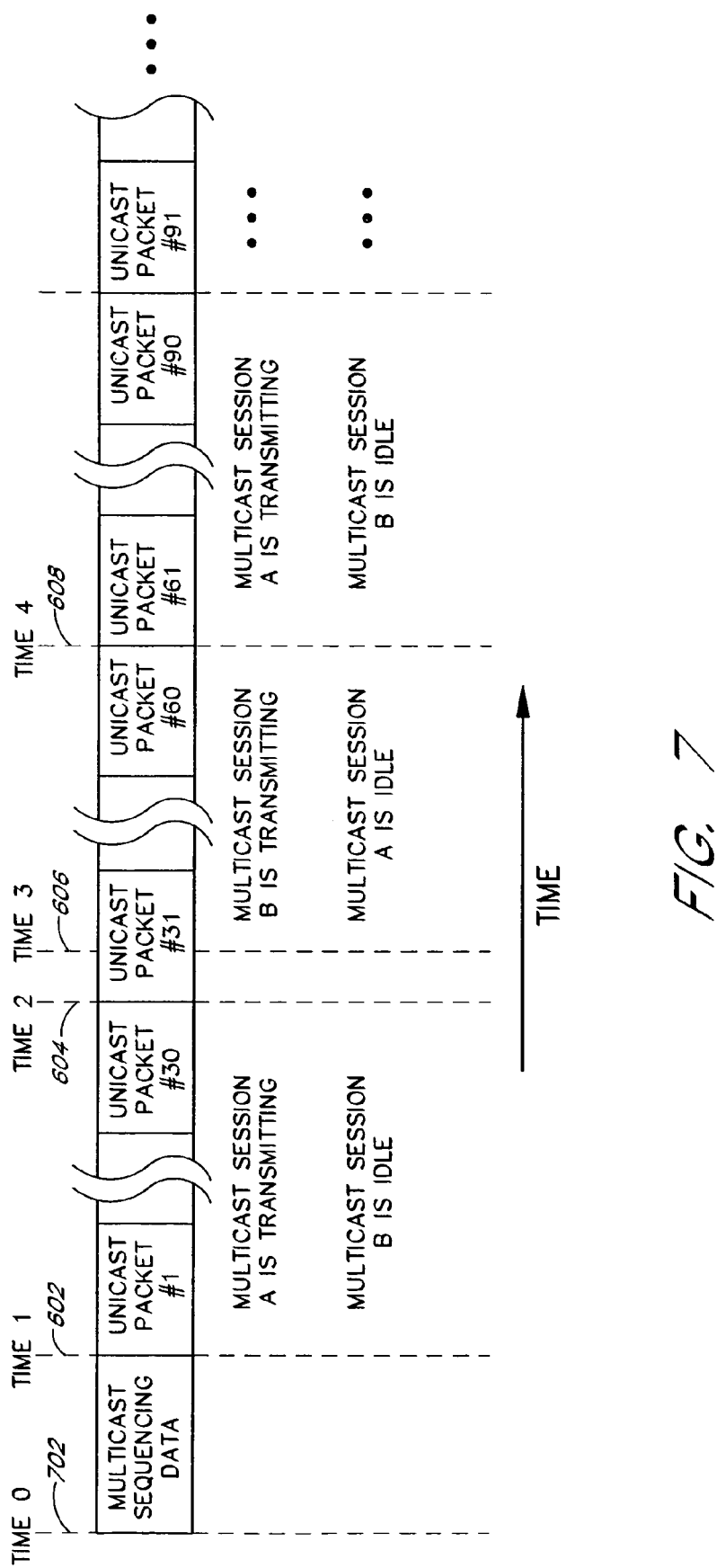
FIG. 7 is an illustration representing a multi-session data stream in accordance with an embodiment of the present invention.

FIG. 7 is an illustration representing a multi-session data stream. Though the invention is not limited by the types of sessions switched or the types of sessions transmitting multicast sequencing data, it is described herein in the context of a switched unicast session transmitting both broadcast data and multicast sequencing data.

At a time 0 702, the client 310 receives multicast sequencing data from the transmitting server 308 over the unicast session. In one embodiment, the multicast sequencing data may be a data packet indicating the sequencing information, such as, by way of example, the multicast sessions which the server 308 will employ in transmitting the multimedia stream, the ordering of the multicast sessions, the length of time each multicast session will transmit the multimedia stream, and the multicast session which will initially start the multimedia stream transmission. For example, the multicast sequencing data may advantageously specify that two synchronized multicast sessions A and B will transmit the multimedia stream, that the multimedia stream will initially start transmitting over multicast session A while multicast session B is initially idle, and that, at intervals corresponding to the transmission of thirty (30) unicast data packets, the multicast sessions will alternate (B becoming active and A becoming idle, or vice versa) transmitting the multimedia stream.

At the time 1 602, the client 310 starts receiving the multimedia stream over the unicast session. The client 310 advantageously determines that at the time 1 602 when the client receives a first unicast packet, the multimedia stream is concurrently being transmitted over the multicast session A while the multicast session B remains idle. The client 310 further determines that the multicast session A will continue transmitting until a thirtieth (30th) unicast packet is received. At the time 2 604, the client 310 starts receiving a thirty-first (31st) unicast packet. The client 310 may also establish, from the sequencing information, that when it starts to receive the thirty-first (31st) unicast packet, the multimedia stream is currently being transmitted over the multicast session B while the multicast session A has become idle. The point at which the thirtieth (30th) unicast packet ends and the thirty-first (31st) unicast packet starts is a multicast synchronize point. The client 310 can further establish that the multimedia stream will continue to be transmitted over multicast session B until it starts receiving the sixty-first (61st) unicast packet at the time 4 608. This is the next multicast synchronize point.

In one embodiment, the client 310 receives unicast packets of substantially equal length. This allows the client 310 to determine a length of time corresponding to the receipt of thirty (30) unicast packets. From this information, the client 310 can advantageously determine a time within which the client 310 may request to join the currently idle multicast session. As an example, the client 310 may determine that the time required to join a multicast session and issue a request to the server 308 to stop transmitting over the unicast session at the next multicast synchronize point is a time corresponding to the receipt of twenty (20) packets over the unicast session. Thus, within the time the client 310 is receiving a first (1st) unicast packet after a multicast synchronize point through the tenth (10th) unicast packet after the multicast synchronize point, the client 310 can advantageously join an idle multicast session and issue a request to the server 308 to stop transmitting over the unicast session at the next multicast synchronize point. As long as the client 310 is not receiving an eleventh (11th) or subsequent unicast packet, the idle multicast session will not begin transmitting the multimedia stream for a sufficiently long period of time. The sufficiently long period of time corresponds to the time required for the client 310 to join a multicast session and issue a request to the server 308 to stop transmitting over the unicast session at the next multicast synchronize point. In this embodiment, if the client 310 is receiving the eleventh (11th) or higher unicast packet since the most recent multicast synchronize point, it may advantageously wait until the next multicast synchronize point to join the then idle multicast session and request the server 308 to stop transmitting over the unicast session at the next multicast synchronize point.

In one embodiment, at a time 3 606, the client 310 may advantageously determine that multicast session B is currently transmitting while the multicast session A is idle. The client 310 can determine that the multicast session A will not be transmitting for the sufficiently long period of time and, therefore, can issue a request to join the idle multicast session A. The client 310 can then request the server 308 to stop transmitting over the unicast session at the next multicast synchronize point. In another embodiment, the client 310 may request the server to stop transmitting over the unicast session at the next multicast synchronize point and then issue a request to join the idle multicast session.

Figure 8:
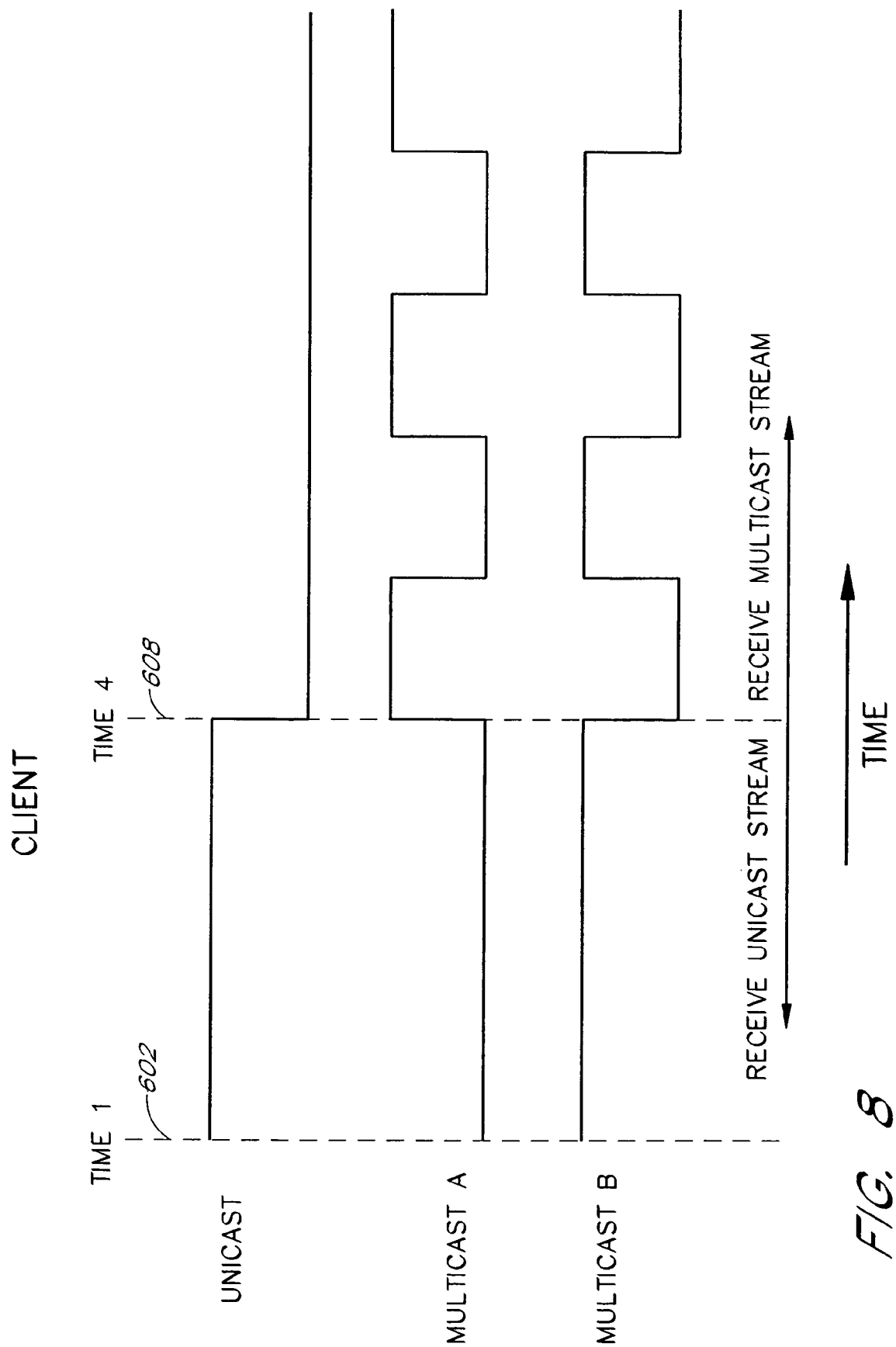
FIG. 8 is a timeline diagram illustrating an embodiment of the multimedia stream reception at a receiving client.

At the next multicast synchronize point, the client 310 starts to receive the multimedia stream over the recently joined multicast session A and no longer receives the multimedia stream over the unicast session. This is illustrated by the time 4 608 in the timeline diagram in FIG. 8. After the client 310 starts receiving the multimedia stream over the multicast session A, the client 310 can issue a request to join the then idle multicast session B. The request to join the multicast session B is issued shortly after the client 310 starts receiving the multimedia stream over multicast session A, thus ensuring that there is sufficient time for the join operation to complete and enabling the client 310 to receive the multimedia stream transmission over the multicast session B at the next multicast synchronize point. In another embodiment, the client 310 may issue a request to join the multicast session B as long as it determines that there is sufficient time for the join operation to complete before the multimedia stream next starts transmitting over the multicast session B. For example, by determining the period of time that multicast session A will be transmitting (e.g. the time required to receive thirty (30) unicast packets), the client 310 may use a timer to ensure that there is still sufficient time for the join operation to complete before the multicast session B starts transmitting again.

Figure 9:
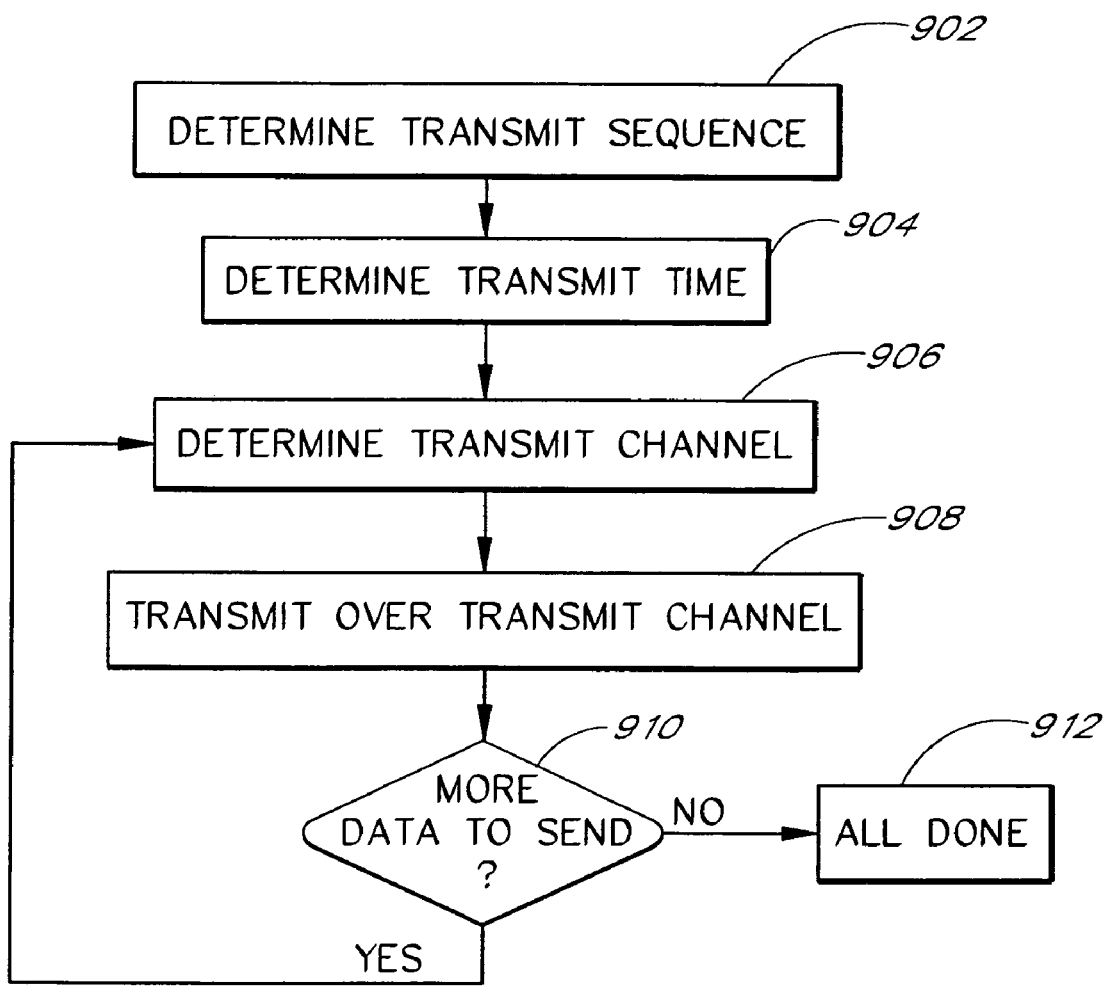
FIG. 9 is a flow chart illustrating the synchronization of the multicast sessions at a transmitting server in accordance with one embodiment of the invention.

FIG. 9 is a flow chart illustrating one embodiment of the synchronization of the multicast sessions at a transmitting server 308. At a step 902, the server 308 determines the sequence of multicast sessions to use in transmitting a multimedia stream. For example, the server 308 may use a multicast session A and a multicast session B to transmit the multimedia stream. The multimedia stream will initially be transmitted over the multicast session A and then alternate to being transmitted over the multicast session B. In one embodiment, this information can be included as part of one or more data packets carrying multicast sequencing data transmitted at the start of the multimedia stream transmission over the unicast session. In other embodiments, three or more synchronized multicast sessions may be used to transmit the multimedia stream.

At a step 904, the server 308 determines a length of time between two successive multicast synchronize points. In one embodiment, the multimedia stream is transmitted over each multicast session for equal lengths of time. In another embodiment, the multimedia stream may be transmitted over a first multicast session for a period of time different than the time the multimedia stream is transmitted over a second multicast session. For example, the multicast session A can transmit for 10 seconds while the multicast session B transmits for 15 seconds. Thus, the time interval between successive multicast synchronize points may not be substantially the same. The transmit time for both sessions is substantially longer than the sum of the time required for a client 310 to join a multicast session and the time required for the server 308 to receive from the client 310 a request to stop transmitting over a unicast session at a next multicast synchronize point. In one embodiment, the time determined at the step 904 is included as part of multicast sequencing data transmitted at the start of the multimedia stream transmission over the unicast session.

At a step 906, the server 308 determines the initial multicast session on which to transmit the multimedia stream. At a step 908, the server 308 starts transmitting the multimedia stream over the multicast session determined at the step 906, and the other multicast sessions are idle. The server 308 transmits over the multicast session for the duration of its transmit time or until the multimedia stream is finished and there is no longer any data to transmit. At a step 910, the server 308 determines if there is more data to send (i.e. whether there is more of the multimedia stream to transmit). If the multimedia stream is finished and, thus, there is no more data to send, then the server 308, at a step 912, finishes transmitting the multimedia stream. If, on the other hand, there is more of the multimedia stream to transmit, then the server 308 goes to the step 906 to determine the next multicast session with which to continue transmitting the multimedia stream. The sequence of steps is repeated until the server 308 finishes transmitting the multimedia stream.

Figure 10:
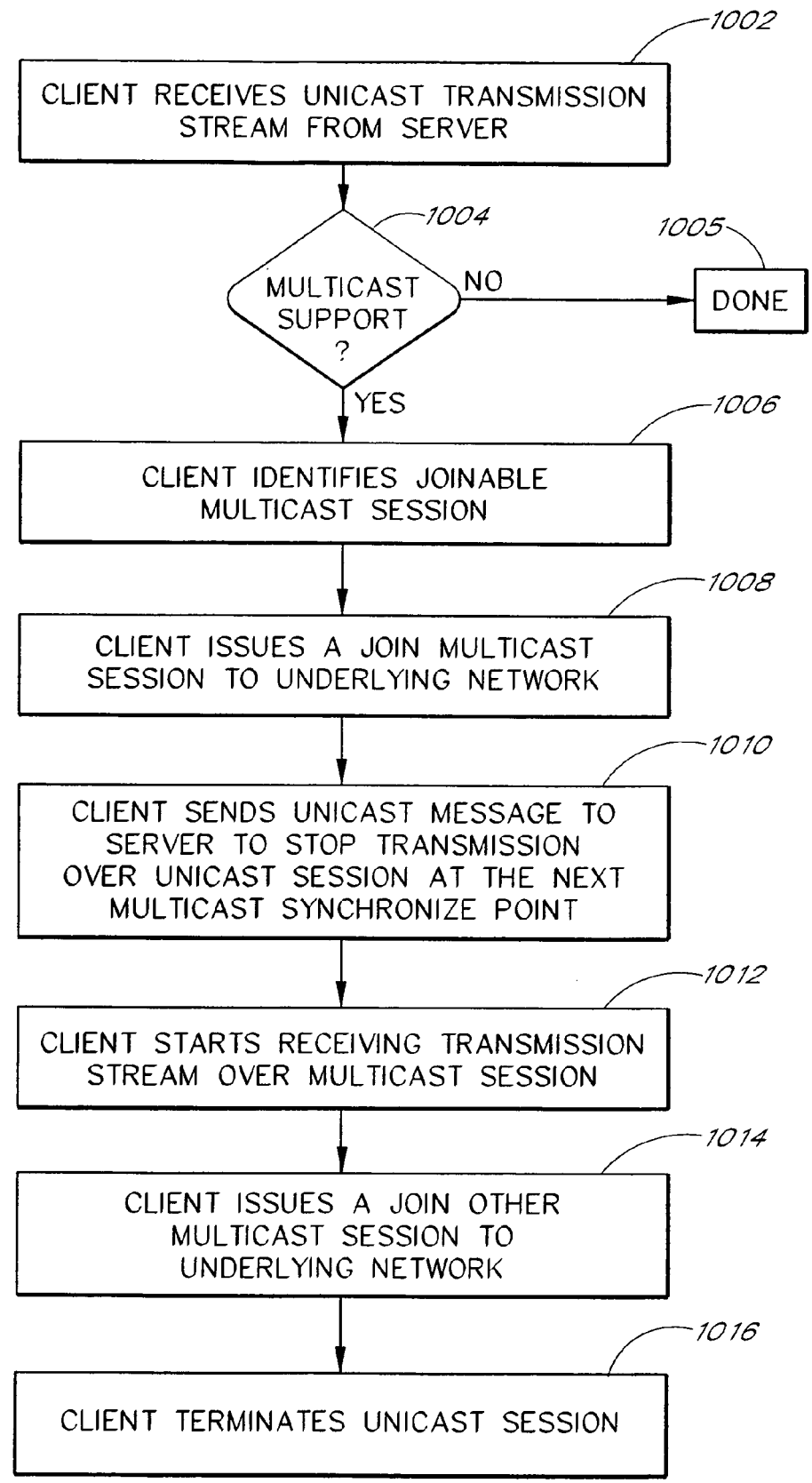
FIG. 10 is a flow chart illustrating the switching from receiving a multimedia stream over a unicast session to receiving the multimedia stream over a plurality of multicast sessions at a receiving client in accordance with one embodiment of the present invention.

FIG. 10 is a flow chart illustrating steps in one embodiment of the invention for switching from receiving a multimedia stream over a unicast session to receiving the multimedia stream over a plurality of multicast sessions at a receiving client 310. At a step 1002, the client 310 starts receiving packets over a unicast session. The client 310 may advantageously receive the multicast sequencing data over the unicast session before the start of the transmission of the multimedia stream over the unicast session. The multicast sequencing data enables the client 310 to determine the transmitting multicast session as well as the idle multicast session or sessions at any point in time. The multicast sequencing data further enables the client 310 to determine a point in time by which it can successfully join an idle multicast session and request the server 308 to stop transmitting over the unicast session at the next multicast synchronize point.

At a step 1004, the client 310 determines if multicast is supported by the underlying network. In one embodiment, the client 310 may join the multicast beacon and subsequently determine the support of multicast by the underlying network. In another embodiment, the client 310 may have determined whether multicast is supported by the underlying network before the step 1002 (i.e. before the client 310 starts receiving packets over the unicast session). If multicast is not supported, the client 310 is all done at a step 1005 and continues to receive the multimedia stream over the unicast session. If multicast is supported, at a step 1006, the client 310 determines the multicast session which is currently idle as well as the time the currently idle multicast session will remain idle; the client 310 determines that the currently idle multicast session remain idle for the sufficiently long period of time. The client 310 determines if there is sufficient time to join the currently idle multicast session and request the server 308 to terminate transmitting the multimedia stream over the unicast session at the next multicast synchronize point. If there is not enough time to complete these operations, the client 310 advantageously waits until the next multicast synchronize point; the point in time when the currently transmitting multicast session becomes idle. Then the client 310 may request to join the currently idle multicast session at a step 1008. If there was sufficient time to complete the operations, then the client 310 can request to join the multicast session at the step 1008 without waiting until the next multicast synchronize point.

At a step 1010, the client 310 requests the server 308 to stop transmitting over the unicast session at the next multicast synchronize point. During this time, the client 310 continues to receive the multimedia stream transmission over the unicast session. At a step 1012, the client 310 no longer receives data over the unicast session and starts to receive the multimedia stream transmission over the recently joined multicast session. The client 310 determines that there is sufficient time to join the other multicast session participating in the multimedia stream transmission and requests to join the plurality of the other participating multicast sessions at a step 1014. In one embodiment, at a step 1016, the client 310 may advantageously terminate the unicast session, for example, by unsubscribing from the unicast session. In another embodiment, the server 308 may terminate the unicast session once it stops transmitting the multimedia stream over the unicast session.

It will be apparent to those of ordinary skill in the art that the advantages of the present invention apply not only in switching from unicast to multicast, but also apply in the context of switching from one set of multicast sessions to another set of multicast sessions. Likewise, it will also be appreciated that the invention is not limited in any way by the type of data transmitted via unicast or multicast sessions, and, in particular, the advantages of the invention apply not only to multimedia streams, but also to other data.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A communications system operable to provide a seamless switch from a unicast session to a plurality of multicast sessions, the communications system comprising:
   a server device operable to provide data over the unicast session and over the plurality of multicast sessions, further operable to transmit identification of joinable multicast sessions, and still further operable to receive data start and data end requests;
   a client device operable to receive data over the unicast session and over the plurality of multicast sessions, to send data start and data end requests, and, responsive to receiving identification of joinable multicast sessions, to identify a joinable multicast session that is idle and will remain idle for a period of time;
   wherein the period of time is sufficient
      for said client device to join the joinable multicast session, and
      for said server device to stop providing data over the unicast session at substantially the time at which the joinable multicast session begins transmitting the data.

2. The communications system of claim 1, wherein said data start and data end requests are user requests.

3. The communications system of claim 1, wherein said data start requests are automatically issued by said client device.

4. The communications system of claim 1, wherein said server device is further responsive to a data end request from said client device by halting said unicast session once said client device starts receiving said data over said joinable multicast session.

5. A method of switching from a first session to a plurality of multicast sessions, said method comprising:
   transmitting first data during said first session;
   transmitting a first portion of second data during a first of said plurality of multicast sessions while a second of said plurality of multicast sessions is idle;
   at a multicast synchronize point, stopping transmission of the first portion of second data such that the first of said plurality of multicast sessions becomes idle;
   also at said multicast synchronize point, transmitting a second portion of said second data over the second of said plurality of multicast sessions;
   transmitting multicast sequencing data representing said multicast synchronize point; and
   responding to a stop request by terminating said transmitting of said first data at said multicast synchronize point.

6. The method of claim 5, further comprising synchronizing said first session and said multicast sessions.

7. The method of claim 5, wherein said plurality of multicast sessions includes only two multicast sessions.

8. The method of claim 5, wherein said first and second data comprise multimedia streams.

9. The method of claim 5, wherein said multicast sequencing data is transmitted over a unicast control channel.

10. The method of claim 5, wherein said multicast sequencing data is transmitted at periodic intervals.

11. The method of claim 5, wherein said period of time is substantially the same for each of said plurality of multicast sessions.

12. The method of claim 5, wherein said period of time is different for each of said plurality of multicast sessions.

13. The method of claim 5, wherein at any point in time prior to said terminating, said first session and one of said plurality of multicast sessions transmits substantially the same data.

14. A method of seamlessly switching from a unicast session to a plurality of synchronized multicast sessions, comprising:
   receiving data during said unicast session and receiving multicast sequencing data;
   selecting, based upon the multicast sequencing data, from said plurality of multicast sessions one multicast session to join;
   indicating a joining of said one multicast session; and
   sending a request while said unicast session is transmitting data that the unicast session stop transmitting data at a next multicast synchronize point.

15. The method as described in claim 14, further comprising the act of unsubscribing from said unicast session.

16. A system operable to switch from sending data during a first session to sending data over first and second consecutive multicast sessions, said system comprising:
   a receiver; and
   a data transmitter configured to transmit first data during said first session, said data transmitter responsive to a stop request to stop transmitting said first data during said first session at a multicast synchronize point, and said data transmitter further configured to alternatingly transmit second data over said first and second consecutive multicast sessions, said second multicast session being idle when said data transmitter transmits a portion of said second data over said first multicast session, said first multicast session idle when said data transmitter transmits a different portion of said second data during said second multicast session.

17. The system of claim 16, wherein said data transmitter is configured to transmit multicast sequencing data representing said multicast synchronize point.

18. The system of claim 17, wherein said data transmitter transmits said multicast sequencing data over said first session.

19. The system of claim 17, wherein said data transmitter transmits said multicast sequencing data over at least one of said first and second multicast sessions.

20. The system of claim 16, wherein said data transmitter is further configured to transmit multicast sequencing data, the sequencing data describing a duration between at least two multicast synchronize points, said duration sufficient for said receiver to join one of said first and second multicast sessions and sufficient for said data transmitter to respond to a stop request sent by said receiver to stop transmitting said first data over said first session at a multicast synchronize point.

21. The system as described in claim 16, wherein said first data and said second data represent substantially the same information.

22. The system as described in claim 16, wherein said first data and said second data represent substantially the same information transmitted at substantially the same time.

23. An apparatus providing a seamless switch from a first unicast session to first and second multicast sessions, comprising:

means for transmitting first data during said first unicast session;

means for transmitting second data during said first and second multicast sessions; and means for sequencing said second data over said first and second multicast sessions so that said first multicast session transmits a first portion of said second data while said second multicast session is idle and so that said second multicast session transmits a second portion of said second data while said first multicast session is idle, wherein said first and second multicast sessions transition from a transmitting state to an idle state, or from an idle state to a transmitting state, at a multicast synchronize point.

24. The apparatus of claim 23, wherein sequencing said second data comprises enabling said first portion of said second data to be transmitted for a duration sufficient to allow a receiver to join said second multicast session and sufficient for said receiver to send a request for said means for transmitting said second data to stop transmitting said second data at said multicast synchronize point.

25. A method of seamlessly switching from a unicast session to a plurality of synchronized multicast sessions, the method comprising:

receiving data over said unicast session, said data including multicast sequencing data for the plurality of synchronized multicast sessions;

selecting from said plurality of multicast sessions one multicast session to join;

joining said one multicast session; and requesting said unicast session to stop transmitting said data at a next multicast synchronize point.

26. The method of claim 25, further comprising unsubscribing from said unicast session.

27. A program storage device storing instructions that when executed perform the steps comprising:

receiving data over a unicast session, said unicast session including multicast sequencing data;

selecting from a plurality of multicast sessions one multicast session to join;

joining said one multicast session; and requesting that during said unicast session transmission of said data cease at a next multicast synchronize point.

28. The program storage device of claim 27, further comprising instructions that when executed unsubscribe from said unicast session.

* * * * *